(12) United States Patent
Licht

(10) Patent No.: US 7,376,446 B2
(45) Date of Patent: May 20, 2008

(54) MOBILE COMMUNICATIONS NETWORK WITH EXPANDED CARRIER CAPACITY AND METHOD OF EXPANDING BASE STATION CARRIER CAPACITY

(75) Inventor: Udo Licht, Atlanta, GA (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 486 days.

(21) Appl. No.: 11/175,640

(22) Filed: Jul. 6, 2005

(65) Prior Publication Data

US 2006/0014568 A1  Jan. 19, 2006

Related U.S. Application Data

(63) Continuation of application No. 60/588,277, filed on Jul. 15, 2004.

(51) Int. Cl.
*H04M 1/00* (2006.01)
(52) U.S. Cl. ............... 455/561; 455/78; 455/182.1; 455/179.1; 455/176.1; 455/188.1
(58) Field of Classification Search .......... 455/561, 455/78, 182.1, 179.1, 176.1, 188.1
See application file for complete search history.

(56) References Cited

U.S. PATENT DOCUMENTS

| | | | |
|---|---|---|---|
| 6,346,912 B1 * | 2/2002 | Reinhart et al. .......... 342/385 |
| 6,603,983 B2 * | 8/2003 | Hildebrand .............. 455/561 |
| 7,181,171 B2 * | 2/2007 | Forrester ................. 455/82 |
| 2004/0077379 A1 * | 4/2004 | Smith et al. ........... 455/562.1 |
| 2004/0119644 A1 * | 6/2004 | Puente-Baliarda et al. .. 343/700 MS |
| 2004/0209590 A1 * | 10/2004 | Forrester et al. .......... 455/324 |
| 2005/0153709 A1 * | 7/2005 | Forrester ................ 455/456.1 |

* cited by examiner

*Primary Examiner*—Jean Gelin
*Assistant Examiner*—YungSang Lau
(74) *Attorney, Agent, or Firm*—Laurence A. Greenberg; Werner H. Stemer; Ralph E. Locher

(57) ABSTRACT

A base station for a mobile communications system, a mobile communications system including the base station and a method of increasing base station capacity. Each base station antenna is coupled to a transmission line that may be connected to a triplexer. The triplexer separates uplink signals from a duplex signal on the transmission line. The uplink and downlink signals are both in two sub-bands that are separated by a third sub-band. The triplexer passes the uplink signal to a duplexer/combiner that forwards the uplink signal to a combiner. The duplexer/combiner and combiner each pass downlink signals in one of the sub-bands to the triplexer, which combines the passes to the duplex signal.

21 Claims, 3 Drawing Sheets

MOBILE COMMUNICATIONS NETWORK WITH EXPANDED CARRIER CAPACITY AND METHOD OF EXPANDING BASE STATION CARRIER CAPACITY

CROSS REFERENCE TO RELATED APPLICATION

The present invention is a continuation of U.S. Provisional Patent Application Ser. No. 60/588,277, entitled "System and Method for Adding Carriers to a Basestation" to Udo Licht, filed Jul. 15, 2004 and assigned to the assignee of the present invention.

BACKGROUND OF THE INVENTION

1. Field of the Invention

The present invention is related to mobile communications and, more particularly, to increasing existing base station capacity without requiring additional antennas.

2. Background Description

Wireless communication systems, such as those supporting Global System for Mobile Communication (GSM), Time Division Multiple Access (TDMA) and Code Division Multiple Access (CDMA) technologies, are characterized by cells or cell sectors with a base transceiver station (BTS) in each. Each BTS, also commonly referred to simply as a "base station," has one or more antennas to support wireless communications with local mobile units, each on a corresponding one of a given number (X) of carriers. Typically, any of the base station antennas can handle mobile units on any of the X carriers. At the antenna and between the particular mobile unit and the antenna, downlink or transmit signals (Tx) are duplexed with uplink or receive signals (Rx) to share a common carrier frequency. A duplexer in the base station separates/combines the channel signals, essentially blocking the outgoing or downlink transmit signal to prevent it from returning to a connected receiver at the incoming or uplink side.

As cell phone technology has become more popular, the number of mobile units in use at any one time has increased proportionately. Thus, the number of mobile units that each base station must handle simultaneously has correspondingly increased. However, keeping pace with this ever-increasing demand has been difficult and very expensive.

If space is available and local authorities are amenable, the most straightforward way to increase wireless network capacity is simply to add more antennas, either by adding more base stations or by adding antennas to existing base stations. Each additional antenna increases the number of carriers available for the base station and, correspondingly, the number of mobile units the base station can handle. However, even with community approval, this is very expensive.

Alternately, capacity may be increased by inserting a standard hybrid combiner stage between an existing antenna and base station duplexers to combine the duplexed carriers for the particular antenna. While a typical state of the art hybrid combiner stage may serve to boost the number of carriers that a base station can handle, the carrier capacity increase does not come without a penalty. Each hybrid combiner stage reduces path signal strength in both directions between the antenna and base station by half or more, i.e., reduces by at least 3 dB both downlink power at the antenna and uplink power to the base station. While an amplifier may be used to amplify the uplink signal at the antenna (and before the hybrid combiner) to recover uplink power and minimize the resulting impact on Rx sensitivity, downlink power can only be recovered by increasing base station transmitter power. Consequently, in cells serviced by downlink-limited base stations, mobile units at the original cell perimeter no longer receive service as a result of increasing base station carrier capacity without increasing transmitter power. This is because losing half of the duplex signal at the duplexer reduces base station coverage for the cell, i.e., to a quarter or less of its original area. So, to maintain coverage when increasing transmitter power is not feasible, base station sites must be added to the network to fill in any remaining coverage holes. Unfortunately, both of these solutions to recovering the signal lost by introducing hybrid combiners are accompanied by serious disadvantages.

Both consume resources that add to base station/network costs including added equipment, installation and operating costs, and complicated network support and maintenance. Adding expensive components to increase downlink power further increases the footprint of each base station and increases base station energy consumption. Also, since each new component has a quantifiable failure rate that combines non-linearly with that of other components, adding these components reduces site reliability. Each new base station site adds not only equipment costs, but also requires real property purchases and construction costs. Furthermore, adding a base station site may require an appreciable effort to obtain the necessary local/national approvals, regulatory and otherwise.

Thus, there is a need for a way to increase existing network capacity with minimal negative impact to the existing network.

SUMMARY OF THE INVENTION

It is therefore a purpose of the invention to increase base station carrier capacity;

It is another purpose of the invention to increase base station carrier capacity without significantly increasing the base station foot print;

It is yet another purpose of the invention to increase base station carrier capacity without adding antennas;

It is yet another purpose of the invention to increase base station carrier capacity without adding antennas and with minimal insertion loss from increased capacity;

It is yet another purpose of the invention to increase base station carrier capacity without adding antennas and without requiring external amplification;

It is yet another object of the invention to combine signals from multiple carriers of the same technology in the same band onto one antenna.

The present invention is related to a base station for a mobile communications system, a mobile communications system including the base station and a method of increasing base station capacity. Each base station antenna is coupled to a transmission line that may be connected to a triplexer. The triplexer separates downlink and uplink signals from a duplex signal on the transmission line. The uplink and downlink signals are each in two sub-bands that are separated by a third sub-band. The triplexer passes the uplink signal to a duplexer/combiner that forwards the uplink signal to a combiner. The duplexer/combiner and combiner each pass downlink signals in one of the sub-bands to the triplexer, which combines the passes to the duplex signal. Thus the triplexer acts as a filtering unit that may be installed onto a base station antenna feeder to combine several wireless carriers onto the antenna. The triplexer is a passive element that requires little or no maintenance, and can be mounted almost anywhere in the site for negligible footprint impact, while incurring minimal expense.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
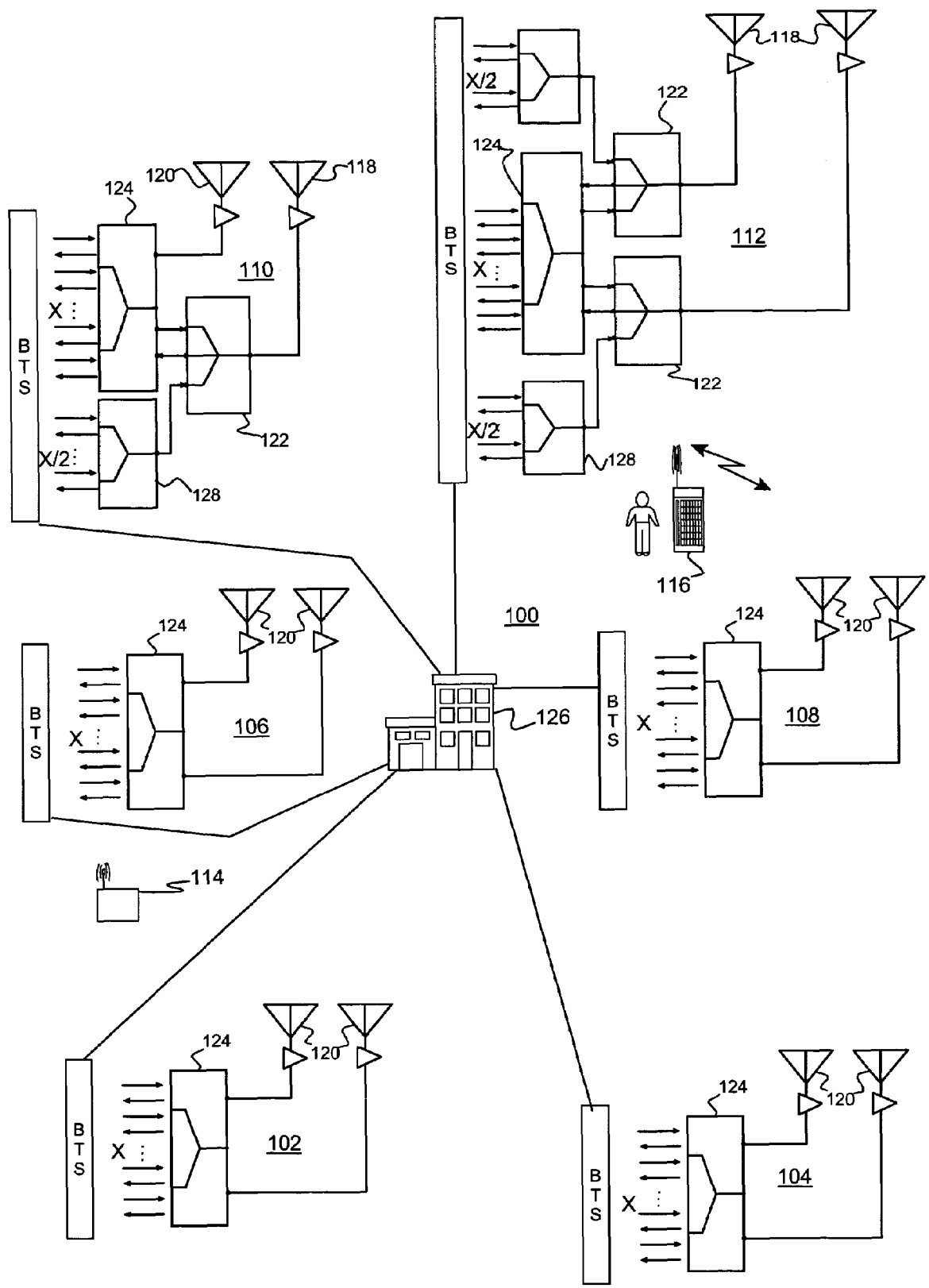
FIG. 1 shows an example of a preferred embodiment wireless network 100 or mobile communication system.

Turning now to the drawings and, more particularly, FIG. 1 shows an example of a preferred embodiment wireless network 100 or mobile communication system, e.g., a single sideband network such as a Global System for Mobile Communication (GSM) network, a Time Division Multiple Access (TDMA) network, Code Division Multiple Access (CDMA) network or an equivalent network. Each Base Transceiver Station (BTS) 102, 104, 106, 108, 110, 112 in the network serves Mobile Stations (MSs) or mobile units 114, 116 within reception range of a base station antenna 118, 120, two in this example. Mobile units 114, 116 may include cellular phone handsets (cell phones) or other devices with a wireless communications interface, e.g., a computing device such as a personal digital assistant (PDA), laptop computer or tablet computer and etc. One or more of the BTSs (110 and 112 in this example) in the wireless network 100 include a triplexer 122 between the base station duplexer/combiner 124 and antenna 118. The triplexer 122 separates the uplink signal from the duplexed antenna signal and passes the separated uplink signal to the duplexer/combiner 124 and the duplexer/combiner 124 forwards a portion of the uplink to a combiner 128. The triplexer 122 also passes downlink signals from the duplexer/combiner 124 and the combiner 128 to the duplexed antenna signal. Including the triplexer 122 and combiner 128 according to a preferred embodiment of the present invention minimizes signal losses, while as much as doubling carrier capacity for each such antenna 118.

In particular, signals from multiple carriers of the same technology in the same band are combined onto one antenna 120, e.g., GSM 1900 MHz carriers are added to other GSM 1900 MHz carriers. Antennas 120 connected directly to a duplexer/combiner 124 in base stations 102, 104, 106, 108, 110 provide half (X/2) of the base station channel capacity. Each combiner 128 adds another half to as much as double channel capacity for a respective antenna 118, i.e., increasing base station capacity by X/2. In this example, base stations 102, 104 106, 108, do not include a triplexer 122 and combiner 128. Preferably, however, a triplexer 122 is included between each of the antennas at each of the base stations 102, 104, 106, 108, 110 and 112. Base stations 102, 104, 106, 108, 110, 112 are connected to a central entity or central network unit 126, which may be a base station controller (BSC) in a base station subsystem (BSS) or, for a GSM system, a serving mobile location center (SMLC) or a suitable equivalent.

Each triplexer 122 expands the number of carriers on each of the respective antenna 118. By acting as diplexer in the downlink path, the triplexer 122 combines two sets of X/2 transmission signals (Tx) and passes the downlink signal on a combined duplex signal to the respective antenna 118. Also, the triplexer 122 acts as a duplexer in the uplink path, separating the incoming receive signals (Rx) for all of the X channels from the Tx signals. Thus, the triplexer 122 and combiner 128 double antenna 118 channel capacity while only reducing downlink power by 0.7 dB or less. Further, channel capacity is increased for each such base station (110, 112) without substantially diminishing cell coverage, i.e., antenna channel capacity increases by half original capacity for each triplexer 122; while cell coverage for the base stations (110, 112) with increased capacity is substantially the same as without the triplexer 122 and combiner 128. Thus, each included triplexer 122 and combiner 128 increase base station capacity and, correspondingly, network 100 capacity.

While simple diplexers have been used to combine signals from different bands (for example Cellular and PCS bands), they cannot be used to combine signals within the same band, because a diplexer requires separation between two signals being combined for proper function. Also, a diplexer requires keeping the Rx and Tx signals from each different carrier in a separate frequency block. When both carriers are in the same band, they cannot be separated into different frequency blocks because the Tx signal for one is sandwiched between the Tx signal for the other and the Rx signals. Consequently, diplexers have not been used to combine signals from multiple carriers of the same technology in the same band and onto a single antenna. However, by allocating channels according to a preferred embodiment of the present invention to maintain a gap between transmission signal bands being combined for a particular antenna and before duplexing, this separation problem is avoided without suffering gaps in the base station transmission band.

Figure 2A:
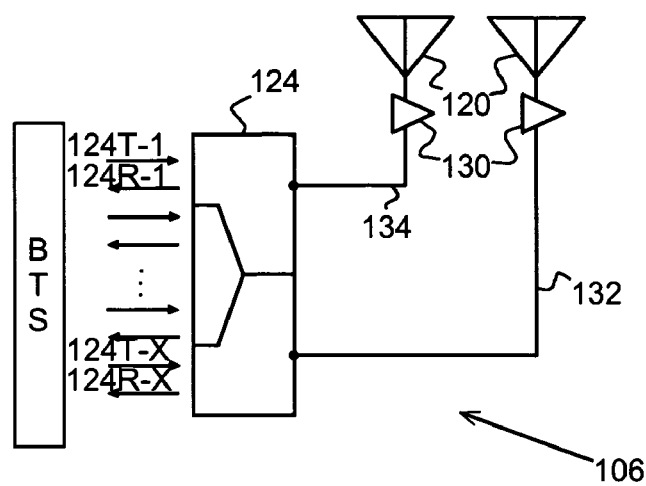
FIGS. 2A-C show examples of a wireless base station without a triplexer and two with triplexers that may be from the same wireless network.
Figure 2B:
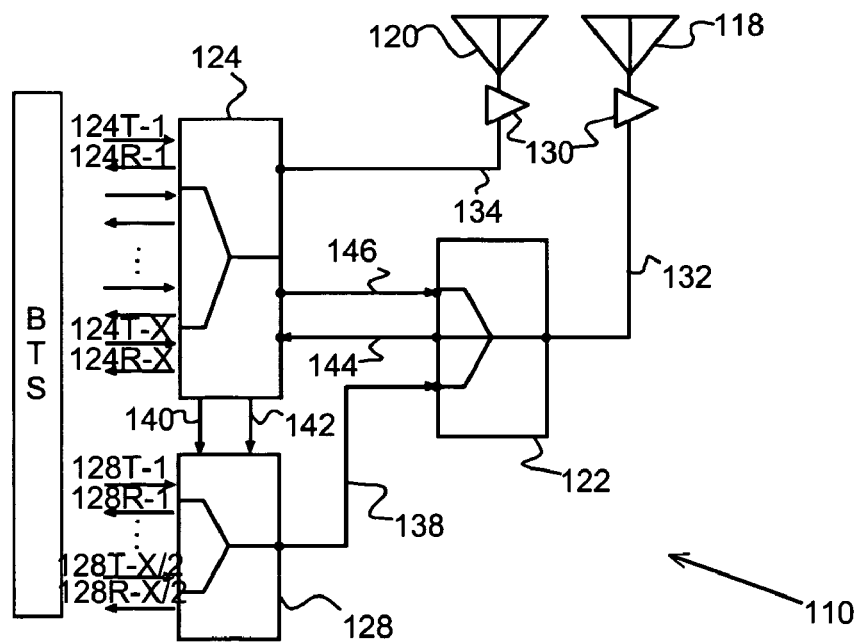
Figure 2C:
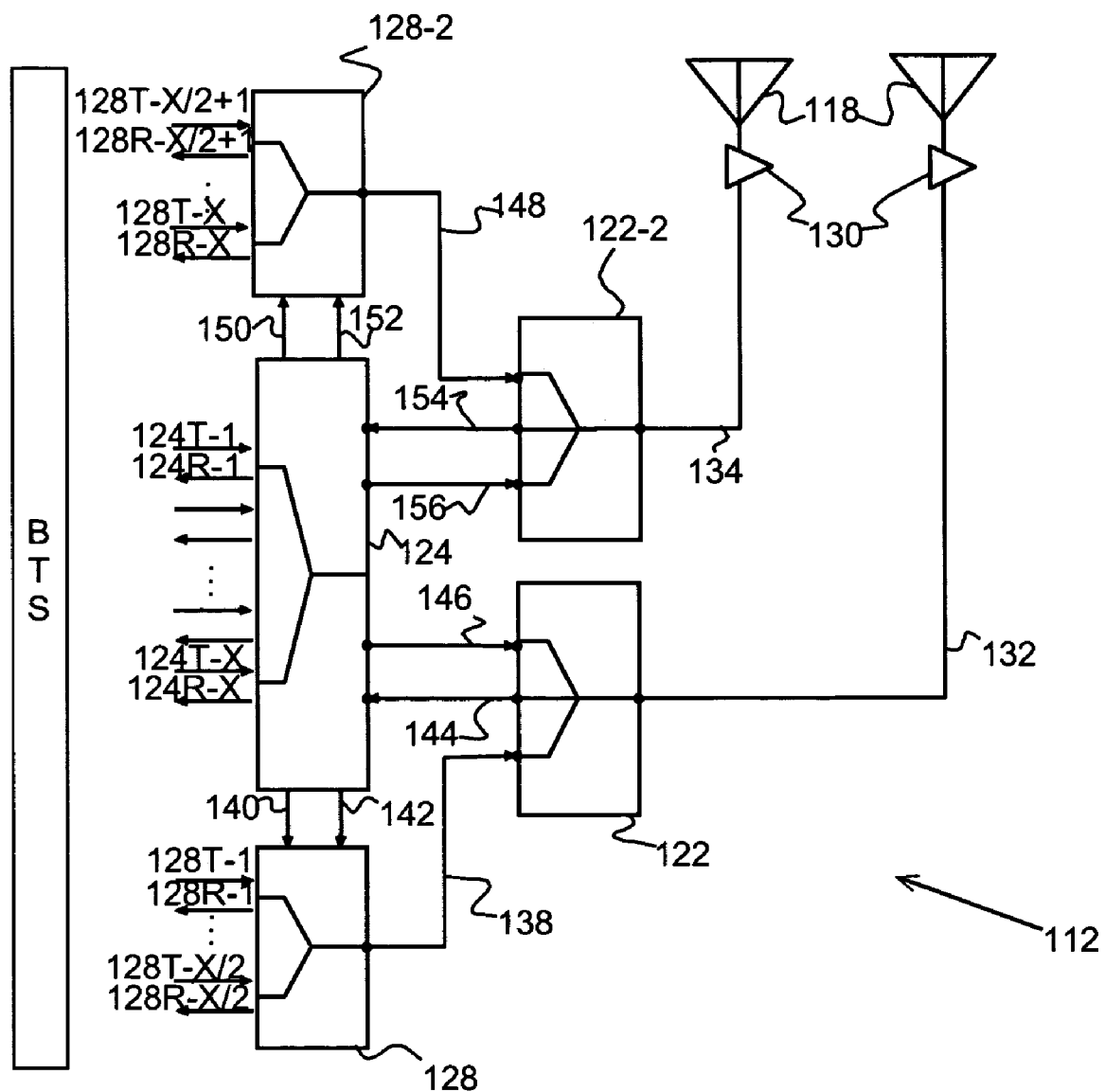

FIGS. 2A-C show examples of a wireless base station (e.g., 106) without a triplexer and two base stations 110, 112 with triplexers 122, that may be from the same network (e.g., 100 in FIG. 1) with like elements labeled identically. Each of the base stations 106, 112, 110 have a pair of antennas 118 and/or 120 and support carriers in the same frequency band. Each base station 112, 110, 106 includes a tower mounted receive amplifier 130 at each respective antenna 118, 120. Base station 106 in FIG. 2A is capable of handling X carriers, with X/2 being assigned to each of the two antennas 120. Each receive amplifier 130 amplifies and passes incoming Rx signals to a duplexed transmission line 132, 134. The other end of each duplexed transmission line 132, 134 is connected to the duplexer/combiner 124, which selectively switches send and receive signals 124T-1, 124R-1, . . . , 124T-X, 124R-X for the X carriers to a respective transmission line 132, 134.

FIG. 2B shows an example of an increased capacity base station (e.g., 110 of FIG. 1) with a triplexer 122 in one antenna 120 path providing an additional X/2 carriers, where X/2 is rounded down to the nearest integer value. For this example, the base station frequency band is segmented into three (3) substantially identical sub-bands, designated high, low and mid. The triplexer 122 handles carriers in the high and low sub-band and carriers in the mid sub-band are passed to the other antenna 120. The combiner 128 combines transmission signals 128T-1, . . . , 128T-X/2 into the low sub-band transmission signal 138 that is passed to the triplexer 122. In this example, the duplexer/combiner 124 passes low sub-band uplink signals 140, 142 to the combiner 128, which separates each of the incoming receive signals 128R-1, . . . 128R-X/2. Thus, the triplexer 122 separates the uplink 144 for all high and low sub-band channels on the duplexed transmission line 132. The duplexer/combiner 124 also combines transmission signals 124T-1, . . . , 124T-X/2 into the high sub-band transmission signal on downlink 146, also passed to the triplexer 122. Thus, the triplexer 122 combines the low sub-band transmission signal 138 with the high sub-band transmission signal on downlink 146 in a single duplex signal that it passes to the transmission line 132.

So, the triplexer 122 splits off the incoming receive signal (Rx) for all channels in both sub-bands on transmission line 132 from the antenna 118 and combines the transmit signal for all X channels and duplexes the combined transmit signal (Tx) to the antenna 118. The full receive signal 144 is passed separately to the duplexer/combiner 124. The triplexer 122 combines the two transmit signals 138, 146, sending the composite signal to the antenna 118. Since the triplexer 122, typically, has only a 0.7 dB signal loss, significantly less signal is lost than would have been using a hybrid combiner. In this example, the mid frequency sub-band is designated for the straight antenna transmission line connection 134 between antenna 120 and the duplexer/combiner 124. So, the low sub-band transmission signal 138 and high sub-band transmission signal 146 have adequate separation. Thus, adequate frequency separation is assured between the two transmit signals for proper triplexer function.

FIG. 2C shows an example of a double capacity base station (e.g., 112 of FIG. 1) with a triplexer 122, 122-2 in both antenna 120 paths providing an additional X carriers, substantially identically to the example of FIG. 2B with like elements labeled identically. For this example, the base station frequency band is segmented into four (4) substantially identical sub-bands, designated high, low, mid-high and mid-low. Each of the triplexers 122, 122-2 handle carriers in non-adjacent sub-bands, i.e. high and mid-low sub-bands on transmission line 132 or mid-high and low sub-bands on transmission line 134. So, in this example, the duplexer/combiner 124 provides mid-high downlink channels on downlink 146. Uplink 144 carries incoming signals. The second combiner 128-2 combines transmission signals 128T-X/2+1, . . . , 128T-X into the high sub-band transmission signal 148 that is passed to the triplexer 122-2. Also, the duplexer/combiner 124 passes the uplink signals 150, 152 to the second combiner 128-2, which separates each of the incoming receive signals 128R-X/2+1, . . . , 128R-X. Similarly, uplink 154 carries the incoming signals to the duplexer/combiner 124, which provides mid-low downlink channels on downlink 156.

Thus, the present invention has application to increasing GSM site capacity without requiring multi-carrier power amplifier (MCPA) boosters or adding antennas. Signals from multiple carriers of the same technology in the same band are combined onto one antenna, e.g., GSM 1900 MHz carriers are added to other GSM 1900 MHz carriers. So, as is the case with many cellular and PCS sites, the present invention has application, especially, to any site that can afford the approx 0.7 dB impact on downlink power and the loss of antenna hopping.

Advantageously, base station capacity may be increased, even where antennas cannot be added, while preserving critical downlink power. Further, base station capacity may be as much as doubled by inserting triplexers before all of the base station antennas over what would normally be available (i.e., without the triplexers) and, also, beyond that any of the other base stations in the network that do not include triplexers. Thus, the present invention has application to improving capacity even where adding an external amplifier is not cost-effective. Accordingly, carriers may be added to a base station without requiring external amplifiers, yet minimizing the impact on coverage for downlink-limited sites.

While the invention has been described in terms of preferred embodiments, those skilled in the art will recognize that the invention can be practiced with modification within the spirit and scope of the appended claims.

What is claimed is:

1. A base station for a mobile communications system, said base station comprising:
   an antenna;
   a triplexer connected to one end of a transmission line, an other end of said transmission line being coupled to said antenna, said triplexer separating an uplink signal from a duplexed signal on said transmission line and passing a downlink signal to said duplexed signal, said downlink signal and said uplink signal both comprising a sub-band pair of signals separated by a third sub-band, each sub-band being a sub-band of a given frequency bandwidth;
   a duplexer/combiner connected to said triplexer and receiving said uplink signal, said duplexer/combiner providing a first downlink signal to said triplexer in one of said sub-band pair; and
   a combiner connected to said duplexer/combiner and said triplexer, said combiner receiving incoming receive signals from said duplexer/combiner and providing a second uplink signal to said triplexer in the other of said sub-band pair.

2. A base station as in claim 1, wherein a mid sub-band separates said sub-band pair, said mobile communications system base station further comprising:
   at least one other antenna; and
   another transmission line, one end of said other transmission line being connected to said duplexer/combiner and another end of said other transmission line being coupled to said at least one other antenna, said duplexer/combiner separating a downlink signal from a mid sub-band duplex signal on said other transmission line and passing an uplink signal to said mid sub-band duplex signal.

3. A base station as in claim 2, wherein carrier capacity for the first said antenna is double carrier capacity for said other antenna.

4. A base station as in claim 3, further comprising a receive amplifier mounted on each said antenna and coupling said each antenna to a respective said transmission line.

5. A base station as in claim 1, further comprising:
   a second antenna;
   a second triplexer connected to one end of a second transmission line, an other end of said second transmission line being coupled to said second antenna, said second triplexer separating a second uplink signal from a second duplex signal on said second transmission line and passing a second downlink signal to said second duplex signal, said second downlink signal and said second uplink signal both comprising a second sub-band pair of signals, one of said second pair being said third sub-band, and one of the first said sub-band pair separating said second sub-band pair, each of said second sub-band pair being a sub-band of said given frequency bandwidth;

said duplexer/combiner being connected to said second triplexer and receiving said second uplink signal, said duplexer/combiner providing a third downlink signal to said second triplexer in one of said second sub-band pair; and a second combiner connected to said duplexer/combiner and said second triplexer, said second combiner receiving incoming receive signals from said duplexer/combiner and providing a fourth downlink signal to said second triplexer in the other of said second sub-band pair.

6. A base station as in claim 5, further comprising a receive amplifier mounted on each said antenna and coupling said each antenna to a respective said transmission line.

7. A mobile communications system including at least one base station in a wireless cell, said at least one base station comprising:
   an antenna;
   a triplexer connected to one end of a transmission line, an other end of said transmission line being coupled to said antenna, said triplexer separating an uplink signal from a duplex signal on said transmission line and passing a downlink signal to said duplex signal, said downlink signal and said uplink signal both comprising a sub-band pair of signals separated by a third sub-band, each sub-band being a sub-band of a given frequency bandwidth;
   a duplexer/combiner connected to said triplexer and receiving said uplink signal, said duplexer/combiner providing a first downlink signal to said triplexer in one of said sub-band pair; and
   a combiner connected to said duplexer/combiner and said triplexer, said combiner receiving incoming receive signals from said duplexer/combiner and providing a second downlink signal to said triplexer in the other of said sub-band pair.

8. A mobile communications system as in claim 7, wherein at least one base station is a plurality of base stations, at least one other of said plurality of base stations comprising:
   another antenna; and
   another said duplexer/combiner connected to one end of another transmission line, an other end of said other transmission line being coupled to said other antenna, said other duplexer/combiner separating an uplink signal from another duplex signal on said other transmission line and passing a downlink signal to said other duplex signal, said downlink signal and said uplink signal both having said given frequency bandwidth.

9. A mobile communications system as in claim 8, wherein carrier capacity for said antenna in said at least one base station is double carrier capacity for said other antenna in said other base station.

10. A mobile communications system as in claim 7, wherein said at least one base station further comprises:
    another antenna; and
    another transmission line, one end of said other transmission line being connected to said duplexer/combiner and another end of said other transmission line being coupled to said other antenna, said other duplexer/combiner separating a mid sub-band uplink signal from another duplex signal on said other transmission line and passing a mid sub-band downlink signal to said other duplex signal, said mid sub-band separating said sub-band pair.

11. A mobile communications system as in claim 10, wherein carrier capacity for the first said antenna is double carrier capacity for said other antenna.

12. A mobile communications system as in claim 11, further comprising a receive amplifier mounted on each said antenna and coupling said each antenna to a respective said transmission line.

13. A mobile communications system as in claim 7, further comprising:
    a second antenna;
    a second triplexer connected to one end of a second transmission line, an other end of said second transmission line being coupled to said second antenna, said second triplexer separating a second uplink signal from a second duplex signal on said second transmission line and passing a second downlink signal to said second duplex signal, said second downlink signal and said second uplink signal both comprising a second sub-band pair of signals, one of said second pair being said third sub-band and one of the first said sub-band pair separating said second sub-band pair, each of said second sub-band pair being a sub-band of said given frequency bandwidth;
    said duplexer/combiner being connected to said second triplexer and receiving said second uplink signal, said duplexer/combiner providing a third downlink signal to said second triplexer in one of said second sub-band pair; and
    a second combiner connected to said duplexer/combiner and said second triplexer, said second combiner receiving incoming receive signals from said duplexer/combiner and providing a fourth downlink signal to said second triplexer in the other of said second sub-band pair.

14. A mobile communications system as in claim 13, wherein at least one base station is a plurality of base stations, at least one other of said plurality of base stations comprising:
    at least one other antenna; and
    another said duplexer/combiner connected to one end of another transmission line, an other end of said other transmission line being coupled to said other antenna, said other duplexer/combiner separating an uplink signal from another duplex signal from said other transmission line and passing a downlink signal to said other duplex signal, said downlink signal and said uplink signal both having said given frequency bandwidth.

15. A mobile communications system as in claim 14, wherein carrier capacity for antennas in said at least one base station is double carrier capacity for said other antenna in said other base station.

16. A mobile communications system as in claim 14, further comprising a receive amplifier mounted on each said antenna and coupling said each antenna to a respective said transmission line.

17. A method of increasing base station carrier capacity in a given bandwidth, said method comprising the steps of:
    a) inserting a triplexer between a transmission line and a duplexer/combiner in a base station, said transmission line being coupled to a base station antenna, said triplexer having an uplink connection to, and a first downlink connection from, said duplexer/combiner;
    b) attaching a combiner to said triplexer and said duplexer/combiner, said combiner having a second downlink connection from said triplexer and an uplink connection from said duplexer/combiner; and c) dividing said given bandwidth into sub-bands including a sub-band pair separated by a mid sub-band, said first downlink being in a first of said sub-band pair and said second downlink being in the other of said sub-band pair, said uplink signal including receive signals in both sub-bands of said sub-band pair.

18. A method as in claim 17, wherein said base station includes a second antenna and said method further comprises coupling carriers in said mid sub-band duplex signal on a second transmission line connected between said duplexer/combiner and said second antenna.

19. A method as in claim 17, wherein said base station includes a second antenna and before dividing step (c), said method further comprises:
- c1) inserting a second triplexer between a second transmission line and said duplexer/combiner, said second transmission line being coupled to said second antenna, said second triplexer having a downlink connection and an uplink connection to said duplexer/combiner; and
- c2) attaching a second combiner to said second triplexer and said duplexer/combiner, said second combiner having a downlink connection to said second triplexer and an uplink connection to said duplexer/combiner.

20. A method as in claim 19, wherein step (c) divides said given bandwidth into at least four sub-bands including two sub-band pairs, each separated by a mid sub-band, one sub-band of each of said two sub-band pairs being said mid sub-band for the other of said two sub-band pairs.

21. A method as in claim 20, wherein said uplink connection to said second triplexer from said duplexer/combiner and said uplink to said second triplexer from said second combiner are each in one sub-band of the second of said two sub-band pairs and said uplink signal from said second triplexer includes receive signals in both sub-bands of said second of sub-band pair.

* * * * *